United States Patent
Noone et al.

[19]

[11] Patent Number: 5,884,671
[45] Date of Patent: Mar. 23, 1999

[54] MULTI-LAYER FUEL AND VAPOR TUBE

[75] Inventors: David L. Noone, Southfield; Frank L. Mitchell, Rochester, both of Mich.

[73] Assignee: ITT Industries, Inc., White Plains, N.Y.

[21] Appl. No.: 818,703

[22] Filed: Mar. 14, 1997

Related U.S. Application Data

[63] Continuation of Ser. No. 897,376, Jun. 11, 1992, Pat. No. 5,678,611, which is a continuation-in-part of Ser. No. 868,754, Apr. 14, 1992, Pat. No. 5,865,218.

[51] Int. Cl.$^6$ ................................................. F16L 11/04
[52] U.S. Cl. .......................... 138/137; 138/141; 138/140; 361/215; 428/36.91
[58] Field of Search .................................. 138/137, 140, 138/141, 138, DIG. 1, DIG. 3, DIG. 7, 124–127; 428/36.91; 361/215

[56] References Cited

U.S. PATENT DOCUMENTS

| | | | |
|---|---|---|---|
| 3,070,132 | 12/1962 | Sheridan | 138/118 |
| 3,166,688 | 1/1965 | Rowand et al. | 317/2 |
| 3,473,087 | 10/1969 | Slade | 317/2 |

(List continued on next page.)

FOREIGN PATENT DOCUMENTS

| | | |
|---|---|---|
| 164766 | 12/1985 | European Pat. Off. . |
| 0551094 | 7/1993 | European Pat. Off. . |
| 2114550 | 5/1972 | France . |
| 2577168 | 8/1986 | France . |
| 2577564 | 8/1986 | France . |
| 1779905 | 2/1972 | Germany . |
| 3821723 | 9/1989 | Germany . |
| 9001467 | 4/1990 | Germany . |
| 4001125 | 12/1990 | Germany . |
| 4001126 | 12/1990 | Germany . |
| 3942353 | 6/1991 | Germany . |
| 3942354 | 6/1991 | Germany . |
| 4006870 | 7/1991 | Germany . |
| 436923 | 7/1991 | Germany . |
| 9007303 | 7/1991 | Germany . |
| 4205301 | 4/1992 | Germany . |
| 4137430 | 5/1993 | Germany . |
| 4214383 | 9/1993 | Germany . |
| 9400522 | 1/1994 | Germany . |
| 2204376 | 11/1988 | United Kingdom . |
| 2211266 | 6/1989 | United Kingdom . |
| 93/25835 | 12/1993 | WIPO . |
| 95/30105 | 11/1995 | WIPO . |
| 97/44186 | 11/1997 | WIPO . |

OTHER PUBLICATIONS

Conductive Polymers & Plastics, pp. 119–174 James M. Margolis (New York, Chapman & Hall) 1989.

Kirk–Othmer Encyclopedia of Chemical Technology, (3rd. Ed) vol. 18, (New York, John Wiley & Son) 1982 p. 407.

ATOCHEM, Safety Data Sheet.

Central Glass Co., Ltd., Flexible Fluoroplastic CEFRAL SOFTt, pp. 1–20.

Shell Chemical Company, Kraton—Compounds Properties Guide.

(List continued on next page.)

Primary Examiner—Patrick F. Brinson
Attorney, Agent, or Firm—Thomas N. Twomey

[57] ABSTRACT

A layered tubing for use in a motor vehicle composed of an outer layer having an inner and an outer face, the outer layer made of an extrudable thermoplastic such as a polyamide such as Nylon 6; a thin intermediate layer uniformly connected with the inner face of the outer layer, the intermediate layer composed of an extrudable melt-processible thermoplastic capable of sufficiently permanent laminar connection with the polyamide outer layer; and an inner barrier layer uniformly connected with the intermediate layer, the inner layer composed of an extrudable, melt processible thermoplastic capable of sufficiently permanent laminar adhesion with the intermediate bonding layer, the thermoplastic preferably containing as a major constituent a fluoroplastic such as polychlorotrifluoroethylene, ethylene tetrafluoroethylene copolymers and the like.

36 Claims, 2 Drawing Sheets

U.S. PATENT DOCUMENTS

| | | | |
|---|---|---|---|
| 3,561,493 | 2/1971 | Maillard et al. | 138/141 |
| 3,828,112 | 8/1974 | Johansen et al. | 174/47 |
| 3,907,955 | 9/1975 | Viennot | 264/105 |
| 4,059,847 | 11/1977 | Phillips et al. | 361/215 |
| 4,243,724 | 1/1981 | Strutzel et al. | 428/474.7 |
| 4,244,914 | 1/1981 | Ranalli et al. | 264/515 |
| 4,272,585 | 6/1981 | Strassel | 138/137 X |
| 4,273,798 | 6/1981 | Scheiber | 427/27 |
| 4,303,457 | 12/1981 | Johansen et al. | 156/149 |
| 4,330,017 | 5/1982 | Satoh et al. | 138/126 |
| 4,448,748 | 5/1984 | Radtke et al. | 420/514 |
| 4,614,208 | 9/1986 | Skarelius | 138/103 |
| 4,659,625 | 4/1987 | Decroly et al. | 428/412 |
| 4,675,780 | 6/1987 | Barnes et al. | 361/215 |
| 4,685,090 | 8/1987 | Krevor | 138/137 X |
| 4,706,713 | 11/1987 | Sadamitsu et al. | 138/137 |
| 4,710,337 | 12/1987 | Nordstrom | 264/508 |
| 4,762,589 | 8/1988 | Akiyama et al. | 138/137 X |
| 4,800,109 | 1/1989 | Washizu | 138/137 X |
| 4,853,297 | 8/1989 | Takahashi et al. | 138/143 X |
| 4,880,036 | 11/1989 | Kitami et al. | 138/137 |
| 4,887,647 | 12/1989 | Igarshi et al. | 138/126 |
| 4,905,734 | 3/1990 | Ito | 138/137 X |
| 4,907,625 | 3/1990 | Ito et al. | 138/126 |
| 4,944,972 | 7/1990 | Blembereg | 428/35.2 |
| 4,948,643 | 8/1990 | Mueller | 138/137 X |
| 4,984,604 | 1/1991 | Nishimura | 138/126 |
| 4,990,383 | 2/1991 | Bergstrom et al. | 428/35.9 |
| 5,019,309 | 5/1991 | Brunnhofer | 264/103 |
| 5,038,833 | 8/1991 | Brunnhofer | 138/137 |
| 5,076,329 | 12/1991 | Brunnhofer | 138/137 |
| 5,112,692 | 5/1992 | Strassel et al. | 428/421 |
| 5,142,782 | 9/1992 | Martucci | 138/125 |
| 5,143,122 | 9/1992 | Adkins | 138/109 |
| 5,167,259 | 12/1992 | Brunnhofer | 138/137 |
| 5,170,011 | 12/1992 | Martucci | 138/118 X |
| 5,219,002 | 6/1993 | Stenger et al. | 138/118.1 |
| 5,219,003 | 6/1993 | Kerschbaumer | 138/137 |
| 5,258,213 | 11/1993 | Mugge et al. | 428/36.91 |
| 5,284,184 | 2/1994 | Noone et al. | 138/121 |
| 5,373,870 | 12/1994 | Derroire et al. | 138/125 |
| 5,380,385 | 1/1995 | Derroire et al. | 156/149 |
| 5,383,087 | 1/1995 | Noone et al. | 138/137 X |
| 5,425,817 | 6/1995 | Mugge et al. | 138/137 |
| 5,524,673 | 6/1996 | Noone et al. | 138/103 |

OTHER PUBLICATIONS

Plastics Digest Thermoplastics and Thermosets International Plastics Selector, ed. 14, vol. 2 (1993).

Shell Chemical Company, Kraton Thermoplastic Rubber—Processing & Fabricating Kraton Thermoplastic Rubber Compounds, pp. 1–26 (Apr. 1988).

Shell Chemical Company, Kraton Rubber Automotive Compound Characteristics.

Shell Chemical Company, Kraton Thermoplastic Rubber—Typical Properties 1990, pp. 1–11.

Advanced Elastomer Systems, Santoprene Thermoplastic Rubber FR Grades—Material Safety Data, pp. 1–5 (Dec. 1, 1990).

Central Glass Co., Ltd., Material Safety Data Sheet, pp. 1–2 (Mar. 18, 1991).

Shell Chemical Company, Material Safety Data Sheet, pp. 1, 3, 5 (Aug. 10, 1990).

Nonmetallic Air Brake System Tubing—SAE J844, SAE Standard (Jun. 1990).

EMS Engineering Polymers, Product Data Bulletin.

Huls America, Inc., Product Information—Vestamid Nylon 12.

Donald V. Rosato, D.P. Di Mattia, & Dominick V. Rosato, Designing with Plastic & Composites: A Handbook, pp. B18–B33 (Van Nostrand Reinhold)(1991).

Advanced Elastomer Systems, Santoprene Thermoplastic Rubber—Product Date Sheet (Nov. 1991).

Advanced Elastomer Systems, Santoprene Thermoplastic Rubber—Fluid Resistance, pp. 1–12 (1992).

DSM Thermoplastic Elastomers, Inc., Sarlink 1000 Series—Material Safety Data Sheet, pp. 1–4 (Jan. 14, 1992).

Novacor Chemicals, Inc., Sarlink Thermoplastic Elastomers—The Alternative TPEs (Jan. 14, 1992).

Novacor Chemicals, Inc., Sarlink 1570—Fuel Resistant Thermoplastic Elastomer for Marine Hose Applications—Data Sheet (Nov. 1989).

Standard Specification for Zinc—5% Aluminum Mischmetal Alloy (UNS 238510) in Ingot Form for Hot–Dip Coatings, pp. 669–670.

State of California Air Resources Board—Public Hearing, pp. 1–2, A2–A4, B2–B43 (Aug. 9, 1990).

Tefzel, Safety in Handling and Use, pp. 1–3, 20–21, 35–37.

Vichem Corporation, Vinyl Compounds—Material Safety Data Sheet (May 30, 1990).

MULTI-LAYER FUEL AND VAPOR TUBE

I. RELATED APPLICATIONS

This application is a continuation of application Ser. No. 07/897,376 filed on Jun. 11, 1992, now U.S. Pat. No. 5,678,611, which is a continuation-in-part of application Ser. No. 07/868,754, filed Apr. 14, 1992, now U.S. Pat. No. 5,865,218.

II. FIELD OF THE INVENTION

The present invention relates to a hose for use in a motor vehicle. More particularly, the present invention relates to a multi-layer hose which can be employed as a fuel line or vapor recovery line in a motor vehicle.

III. BACKGROUND OF THE INVENTION

Single layer fuel lines and vapor return lines of synthetic materials such as polyamides have been proposed and employed in the past. Fuel lines employing such materials generally have lengths of at least several meters. It is important that the line, once installed, not materially change during the length of operation, either by shrinkage or elongation or as a result of the stresses to which the line may be subject during use.

It is also becoming increasingly important that the lines employed be essentially impervious to hydrocarbon emissions due to permeation through the tubing. It is anticipated that future Federal and state regulations will fix the limit for permissible hydrocarbon emissions due to permeation through such lines. Regulations which will be enacted in states such as California will fix the total passive hydrocarbon emission for a vehicle at 2 $g/m^2$ per 24 hour period as calculated by evaporative emission testing methods such as those outlined in Title 13 of the California Code of Regulations, section 1976, proposed amendment of Sep. 26, 1991. To achieve the desired total vehicle emission levels, a hydrocarbon permeation level for the lines equal to or below 0.5 $g/m^2$ per 24 hour period would be required.

Finally, it is also imperative that the fuel line employed be impervious to interaction with corrosive materials present in the fuel such as oxidative agents and surfactants as well as additives such as ethanol and methanol.

Various types of tubing have been proposed to address these concerns. In general, the most successful of these have been co-extruded multi-layer tubing which employ a relatively thick outer layer composed of a material resistant to the exterior environment. The innermost layer is thinner and is composed of a material which is chosen for its ability to block diffusion of materials such as aliphatic hydrocarbons, alcohols and other materials present in fuel blends, to the outer layer. The materials of choice for the inner layer are polyamides such as Nylon 6, Nylon 6.6, Nylon 11, and Nylon 12.

Alcohol and aromatics in the fluid conveyed through the tube diffuse at different rates through the tubing wall from the aliphatic components. The resulting change in the composition of the liquid in the tubing can change the solubility thresholds of the material so as, for example, to be able to crystalize monomers and oligomers of materials such as Nylon 11 and Nylon 12 into the liquid. The presence of copper ions, which can be picked up from the fuel pump, accelerates this crystallization. The crystallized precipitate can block filters and fuel injectors and collect to limit travel of the fuel-pump or carburetor float as well as build up on critical control surfaces of the fuel pump.

In U.S. Pat. No. 5,076,329 to Brunnhofer, a five-layer fuel line is proposed which is composed of a thick outer layer formed of Nylon 11 or Nylon 12, a thick intermediate layer of Nylon 6, and a thin intermediate bonding layer between and bonded to the intermediate and outer layers formed of a polyethylene or a polypropylene. On the interior of the tube is an inner layer of Nylon 6 with a thin intermediate solvent-blocking layer formed of an ethylene-vinyl alcohol copolymer transposed between. The use of Nylon 6 in the inner fluid contacting surface is designed to eliminate at least a portion of the monomer and oligomer dissolution which occurs with Nylon 11 or Nylon 12.

In U.S. Pat. No. 5,038,833 to Brunnhofer, a three-layer fuel line is proposed in which a tube is formed having a co-extruded outer wall of Nylon 11 or Nylon 12, an intermediate alcohol barrier wall formed from an ethylene-vinyl alcohol copolymer, and an inner water-blocking wall formed from a polyamide such as Nylon 11 or Nylon 12. In DE 40 06 870, a fuel line is proposed in which an intermediate solvent barrier layer is formed of unmodified Nylon 6.6 either separately or in combination with blends of polyamide elastomers. The internal layer is also composed of polyamides; preferably modified or unmodified Nylon 6 while the outer layer is composed of either Nylon 6 or Nylon 12.

Another tubing designed to be resistant to alcoholic media is disclosed in UK Application Number 2 204 376 A in which a tube is produced which has an thick outer layer composed of polyamides such as Nylon 6 or 6.6 and/or Nylon 11 or 12 which are co-extruded with an alcohol-resistant polyolefin, a co-polymer of propylene and maleic acid.

Heretofore it has been extremely difficult to obtain tubing having sufficient characteristics of strength and durability having a Nylon 6 outer layer and to obtain satisfactory lamination characteristics between dissimilar polymer layers. While previous disclosures have suggested in passing, multi-layer tubing having Nylon 6 outer layers, none have been effective for use in automobile vehicles due to short comings in strength and elongation properties. Thus, use of polyamides has been limited to Nylon 11 and 12. Additionally, the previous disclosures fail to address or appreciate the phenomenon of electrostatic discharge.

Electrostatic discharge can be defined as the release of electric charge built up or derived from the passage of charged particles through a medium or conduit composed of essentially non-conductive materials. The electrostatic charge is repeatedly replenished with the passage of additional volumes of fuel through the conduit. Discharge repeatedly occurs in the same localized area gradually eroding the area and leading to eventual rupture leading to the danger of fire and explosion of the flammable contents of the tubing.

Thus it would be desirable to provide a tubing material which could be employed in motor vehicles which would be durable and prevent or reduce permeation of organic materials therethrough. It would also be desirable to provide a tubing material which would be essentially nonreactive with components of the liquid being conveyed therein. Finally, it would be desirable to provide a tubing material which would be capable of preventing the build-up of electrostatic charge therein or would be capable of safely dissipating any electrostatic charge induced therein.

SUMMARY OF THE INVENTION

The present invention is a multi-layer tube which can be used on motor vehicles for applications such as in a fuel line or a vapor return or recovery line. The tube of the present invention is composed of:

a thick flexible outer tubing having an inner and an outer face, the outer tubing consisting essentially of an extrudable melt processible thermoplastic polyamide having an elongation value of at least 150%;

a thin intermediate bonding layer bonded to the inner face of the thick outer layer, the bonding layer consisting essentially of an extrudable melt processible thermoplastic capable of sufficiently permanent laminar adhesion to the outer tubing; and an inner hydrocarbon barrier layer bonded to the intermediate bonding layer, the inner layer consisting of an extrudable melt-processible thermoplastic capable of sufficiently permanent laminar adhesion with the intermediate bonding layer, the thermoplastic containing as a major constituent a fluoroplastic selected from the group consisting of polychlorotrifluoroethylene, ethylene tetrafluoroethylene copolymers, and mixtures thereof.

The inner hydrocarbon layer may capable of dissipating electrostatic energy, the electrostatic dissipation capacity being in a range sufficient to prevent electrostatic discharge from the tube.

DESCRIPTION OF THE DRAWING

The objects, features and advantages of the present invention will become more readily apparent from the following description, reference being made to the following drawing in which.

DESCRIPTION OF THE PREFERRED EMBODIMENT

Figure 1:
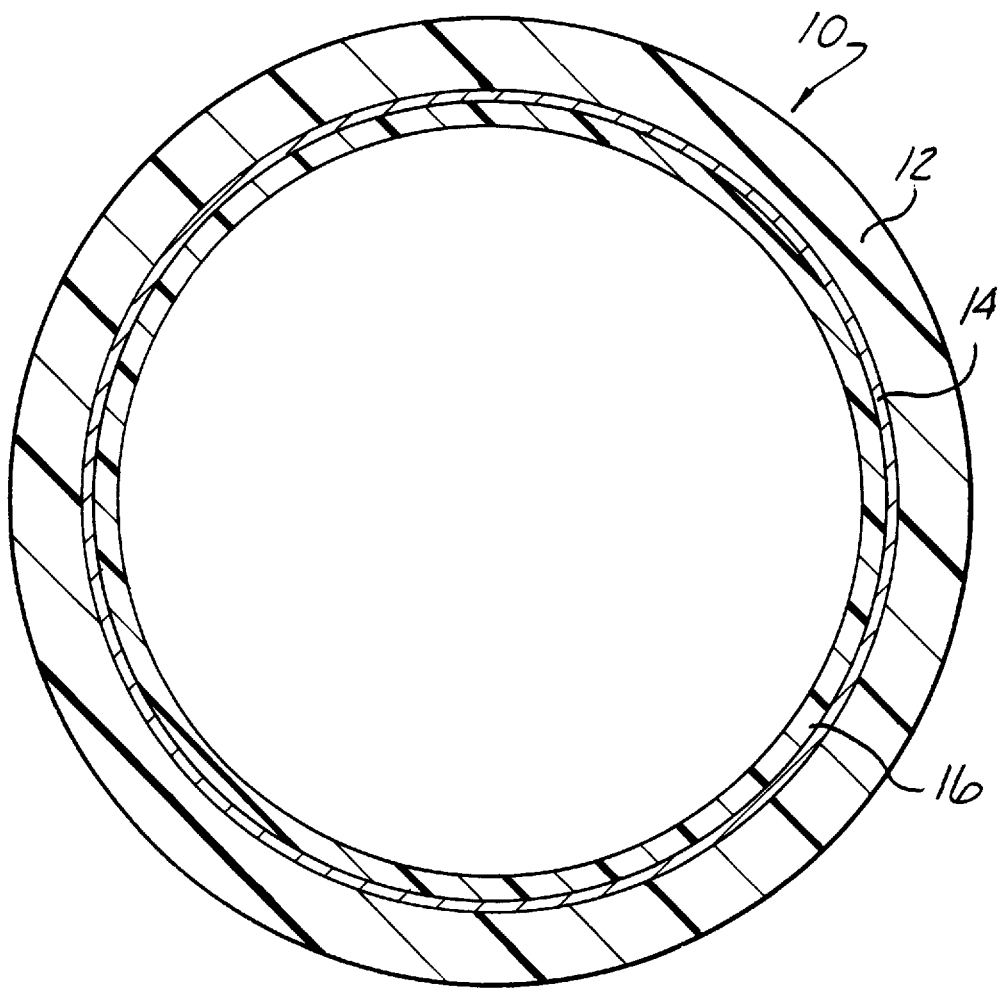
FIG. 1 is a sectional view through a piece of tubing of the present invention and FIG. 2 is a sectional view through a piece of tubing which includes the optional jacket surrounding the outer layer of the tubing of FIG. 1.
Figure 2:
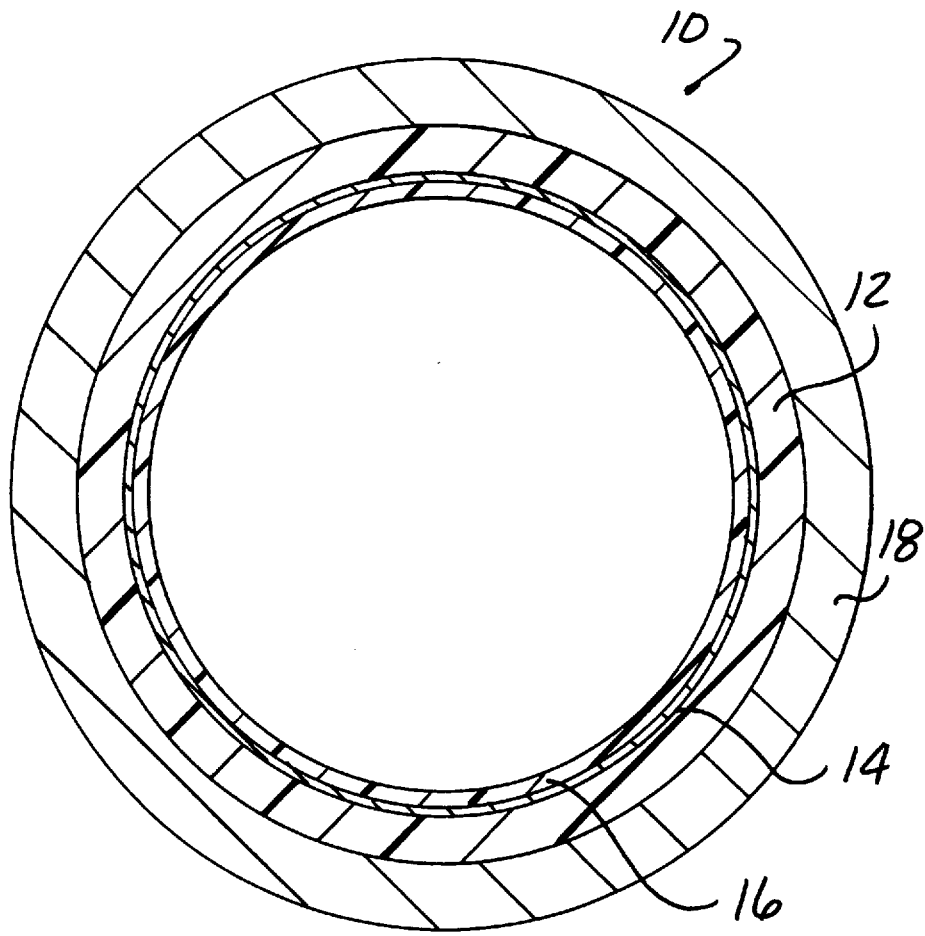

The present invention is a multi-layer fuel line and vapor tube which contains at least one bonding layer and at least an outer and an inner tubing layer. The tubing of the present invention is, preferably, fabricated by co-extruding given thermoplastic materials in a conventional co-extrusion process. The tubing may either be co-extruded to a suitable length or may be co-extruded in continuous length and cut to fit the given application subsequently. The tubing of the present invention may have an outer diameter up to 50 mm. However, in applications such as fuel lines and vapor recovery systems, outer diameter of up to 2.5 inches are preferred.

The material may have any suitable wall thickness desired. However, in automotive systems such as those described herein, wall thicknesses between 0.5 mm and 2 mm are generally employed with wall thicknesses of approximately 0.8 to 1.5 mm being preferred. While it is within the scope of this invention to prepare a tubing material having a plurality of overlaying layers of various thermoplastic materials, the tubing of the present invention generally has a maximum of five layers inclusive of the bonding layers. In the preferred embodiment, the tubing material has three or four.

The tubing 10 of the present invention is a material which is suitable for use in motor vehicles and comprises a relatively thick outer layer 12 which is non-reactive with the external environment and can withstand various shocks, vibrational fatigue, and changes in temperature as well as exposure to various corrosive or degradative compounds to which it would be exposed through the normal course of operation of the motor vehicle.

It is anticipated that both the outer tubing layer 12 as well as any interior layers bonded thereto would be suitable for use at an outer service temperature range between about −40° C. and about 150° C., with a range of −20° C. to 120° C. being preferred. The various layers of tubing are integrally laminated to one another and resistant to delamination throughout the lifetime of the tubing. The multi-layer tubing of the present invention will have a tensile strength of no less than $25N/mm^2$ and an elongation value of at least 150%. The tubing will have a burst strength at 23° C. and 120° C. of at least 20 bar. The multi-layer tubing of the present invention is sufficiently resistant to exposure to brake fluid, engine oil and peroxides such as those which may be found in gasoline.

The outer layer 12 may be composed of any melt-processible extrudable thermoplastic material which is resistant to ultra violet degradation, extreme changes in heat and exposure to environmental hazards such as zinc chloride, and degradation upon contact with engine oil and brake fluid. In general, the exterior layer consists essentially of 6-carbon block polyamides, such as Nylon 6, which either inherently exhibit sufficient resistance or contain effective amounts of suitable modifying agents to achieve such resistance to degradation upon exposure to zinc chloride.

The Nylon 6 which composes the outer layer can be employed can also be modified with various plasticizers, flame retardants and the like in manners which would be known to one reasonably skilled in the art.

In the preferred embodiment, the outer layer is composed of a polyamide thermoplastic derived from the condensation polymerization of caprolactam. Such materials are commonly referred to as 6-carbon block polyamides or Nylon 6. In the preferred embodiment, the 6-carbon block polyamide contains sufficient quantities of modifying agents to impart a level of zinc chloride resistance greater than or equal to that required by test method SAE J844; non-reactivity after 200 hour immersion in a 50% by weight aqueous zinc chloride solution. In the preferred embodiment, the 6-carbon block polyamide material is a multi-component system comprised of a Nylon-6 copolymer blended with other Nylons and olefinic compound. The zinc-chloride resistant Nylon-6 of choice will have a melt temperature between about 220° C. and 240° C. Examples of thermoplastic materials suitable for use in the tubing of the present invention are propriety materials which can be obtained commercially under the tradenames M-7551 from NYCOA Corporation and ALLIED 1779 from Allied Chemical.

The 6-carbon black polyamide may, optionally, include other modifying agents such as various plasticizing agents generally present in amounts between about 1.0% and about 13% by total weight of the thermoplastic composition. as are readily known in the art. The polyamide material employed, preferably, is an impact-modified material capable of withstanding impacts of at least 2 foot pounds at temperatures below about −20° C.

The outer layer 16 has a wall thickness sufficient to provide suitable strength and endurance to the multi-layer tubing of the present invention. In applications involving automotive vehicles, the outer layer 12 comprises between about 50% and about 60% of the total wall thickness. In general, the outer layer has a wall thickness between about 0.5 mm and about 0.8 mm; with a preferred wall thickness between about 0.6 mm and about 0.7 mm. As indicated previously, the material can be extruded by conventional co-extrusion methods to any continuous length desired.

The inner layer 14 is integrally bonded to the inner surface of the thick outer polyamide layer 12. In the present invention, the inner layer 14 is a chemically dissimilar permeation resistant, chemical resistant, fuel resistant thermoplastic material which is melt processible in normal ranges of extrusion, i.e. about 175° to about 250° C. By the term "chemically dissimilar" it is meant that the inner layer 14 consists essentially of a non-polyamide material which is capable of adhesion to a bonding layer interposed between the thick outer layer and the inner layer in a manner which will be described subsequently.

In the preferred embodiment, the thermoplastic material which comprises the inner layer is a fluoroplastic material selected from the group consisting of polychlorotrifluoroethylene, ethylene tetrafluoroethylene copolymers, and mixtures thereof. The material employed will, preferably, have a melt temperature between about 270° C. and 560° C. and a specific gravity of 1.7.

Suitable polytrifluorochloroethylene fluoroplastic materials may be derived from the pyrolysis of chlorodifluoromethane. Suitable ethylene tetrafluoroethylene copolymers are proprietary materials. It is believed that such materials broadly have ethylene contents between about 40% and about 70%; tetrafluoroethylene contents between about 30% and about 60% by total weight of the polymer; and may contain minor amounts of other proprietary materials. Suitable material is commercially available under the tradenames "TEFZEL 210", "TEFZEL 200", and "TEFZEL 280" commercially available from I. G. duPont de Nemours, Inc. of Wilmington, Del.

The thermoplastic material employed in the inner layer is capable of serving as a hydrocarbon barrier to prevent significant permeation of the aromatic and aliphatic components of gasoline through to the polyamide outer layer of the tubing and thus, out to the surrounding environment.

In the preferred embodiment, the inner layer 14 can also exhibits conductive characteristics in that it is capable of dissipation of electrostatic charge in the range sufficient to prevent build up of electrostatic charge in the tubing. The thermoplastic material employed in the present invention may be inherently conductive in these ranges or, preferably, includes in its composition a conductive media in sufficient quantity to permit electrostatic dissipation in the range defined. The conductive media may be any suitable material of a composition and shape capable of effecting this static dissipation. The conductive material may be selected from the group consisting of elemental carbon, stainless steel and highly conductive metals such as copper, silver, gold, nickel, silicon and mixtures thereof. The term "elemental carbon" as used herein is employed to describe and include materials commonly referred to as "carbon black". The carbon black can be present in the form of carbon fibers, powders, spheres, and the like.

The amount of conductive material contained in the thermoplastic is generally limited by considerations of low temperature durability and resistance to the degradative effects of the gasoline or fuel passing through the tubing. In the preferred embodiment, the thermoplastic material contains conductive material in an amount sufficient to effect electrostatic dissipation. However, the maximum amount employed therein is less than 5% by volume.

The conductive material can either be blended into the crystalline structure of the polymer or can be incorporated during polymerization of monomers that make up the thermoplastic material. Without being bound to any theory, it is believed that carbon-containing materials such as carbon black may be subject to incorporation with the surrounding thermoplastic material. Material such as stainless steel are more likely to be blended into the crystalline structure of the polymer.

The thermoplastic employed in the inner layer 14 of the present invention is, preferably, chemically dissimilar in structure and composition to the outer polyamide layer. In order to accomplish effective lamination of the two dissimilar materials, the tubing of the present invention also includes at least one intermediate layer 16 interposed between the two previously described layers and co-extruded therewith which is capable of achieving a suitable homogeneous bond between itself and the two respective layers. The intermediate bonding layer 16 is generally composed of a more elastic material than the material employed in the inner layer.

In the preferred embodiment, the intermediate bonding layer 16 is composed of a thermoplastic material which also exhibits properties of resistance to permeation of aliphatic and aromatic materials such as those found in fuel. The thermoplastic material employed herein is preferably a melt-processible co-extrudable thermoplastic which may or may not contain various plasticizers and other modifying agents. The intermediate bonding layer 16 consists essentially of a thermoplastic material selected from the group consisting of polymers of polyvinylidine fluoride, polymers of polyvinyl fluoride, polyvinyl acetate and urethane, and mixtures thereof. The preferred fluoroplastic materials are a polyvinylidine fluoroplastics derived from the thermal dehalogenation of chlorodifluoroethane. The material of choice exhibits an affinity to conventional polymers such as Nylon 12; with polyvinylidine fluoride being the preferred fluoroplastic material and a polyvinyl acetate/urethane blend being the preferred non-fluoroplastic material. Suitable polymeric materials are commercially available under the tradenames "ADEFLON A" and "ADEFLON D" from Atochem Inc. elf Aquitaine Group of Philadelphia, Pa.

The intermediate bonding layer 16, in addition to permitting a homogeneous bond between the inner and outer layers and exhibiting resistance to permeation of fuel components, also may exhibit conductive or electrostatic dissipative characteristics such as those described previously. Thus, the intermediate bonding layer 16 may, optionally, include sufficient amounts of a conductive media to effect electrostatic dissipation. As with the inner layer, the intermediate bonding layer may be inherently electrostatically dissipative or may be rendered so by the inclusion of certain conductive material such as those selected from the group consisting of elemental carbon, stainless steel, copper, silver, gold, nickel, silicon and mixtures thereof.

In the preferred embodiment, the inner layer 14 and the bonding layer 16 are maintained at the minimum thickness to prevent permeation of the fuel through the tubing material. It is preferred that the amount of hydrocarbon permeation be no greater than 0.5 g/m$^2$ in a 24 hour interval. It is anticipated that the thickness of the inner and intermediate layers can be modified to accomplish this end.

In the preferred embodiment, the inner layer has the minimum wall thickness sufficient to achieve the permeation resistance desired. In general, the inner layer is thinner than the outer layer with the thickness of the outer layer being between about 50% and about 60% of the total wall thickness of the tubing. In the specified embodiment, the inner wall thickness is between about 0.05 mm and about 0.2 mm with a thickness of about 0.05 mm to about 0.17 mm being preferred. The intermediate bonding layer generally may have a thickness less than or equal to that of the inner layer.

The intermediate bonding layer is of sufficient thickness to permit an essentially homogeneous bond between the inner and outer layers. In general, the intermediate bonding layer can be thinner than the other two layers and can constitute between about 5% and about 20% of the total wall thickness. In the specified embodiment, the thickness of the intermediate bonding layer is between about 0.05 mm and about 0.2 mm with a thickness between about 0.05 mm and about 0.15 mm being preferred.

The total wall thickness of the tubing of the present invention is generally between about 0.5 mm and about 2.0 mm with a wall thickness between about 0.8 and about 1.25 mm being preferred.

The tubing of the present invention may also, optionally include an outer jacket 18 which surrounds the outer layer. The fourth outer jacket may be either co-extruded with the other layers during the extrusion process or may be put on in a subsequent process such as cross-extrusion. The outer jacket may be made of any material chosen for its structural or insulating characteristics and may be of any suitable wall thickness. In the preferred embodiment, the outer jacket may be made of a thermoplastic material selected from the group consisting of zinc-chloride resistant Nylon 6, Nylon 11, Nylon 12, polypropylene, and thermoplastic elastomers such as SANTOPRENE, KRATON, VICHEM and SARLINK. If desired, these materials may be modified to include flame retardants, plasticizers and the like.

What is claimed is:

1. A layered tubing for use in a motor vehicle, the tubing comprising:
    an outer layer having an inner and an outer face, the outer layer consisting essentially of an extrudable melt-processible thermoplastic;
    an intermediate layer uniformly connected with the inner face of the outer layer in sufficiently permanent laminar connection with the inner face, the intermediate layer consisting essentially of an extrudable non-polyamide, melt-processible thermoplastic; and
    an inner layer uniformly connected with the intermediate layer in sufficiently permanent laminar connection with the intermediate bonding layer, the inner layer consisting of an extrudable, melt-processible thermoplastic material.

2. The tubing of claim 1 wherein the inner layer is capable of dissipating electrostatic energy, the electrostatic dissipation capacity being sufficient to minimize accumulation of electrostatic charge in the tubing.

3. The tubing of claim 1 wherein the inner layer contains quantities of a conductive material sufficient to provide electrostatic dissipation capability sufficient to minimize accumulation of electrostatic charge in the tubing.

4. The tubing of claim 3 wherein the conductive material is selected from the group consisting of elemental carbon, copper, silver, gold, nickel, silicon, and mixtures thereof.

5. The tubing of claim 4 wherein the conductive material is present in an amount less than about 5% by volume of the thermoplastic material of the inner layer.

6. The tubing of claim 4 wherein the conductive material is blended into the melt-processible thermoplastic material.

7. A layered tubing for use in a motor vehicle, the tubing comprising:
    an outer layer having an inner and an outer face, the outer layer consisting essentially of an extrudable melt-processible thermoplastic;
    an intermediate layer uniformly connected with the inner face of the outer layer, the intermediate layer consisting essentially of an extrudable melt processible thermoplastic capable of sufficiently permanent laminar connection with the inner face of the outer layer; and
    an inner layer uniformly connected with the intermediate layer, the inner layer consisting of an extrudable, melt-processible thermoplastic capable of sufficiently permanent laminar connection with the intermediate layer;
    wherein the inner layer contains quantities of a conductive material sufficient to provide electrostatic dissipation capability sufficient to minimize accumulation of electrostatic charge in the tubing, wherein the conductive material is elemental carbon and is incorporated during polymerization of monomers that make up the thermoplastic material.

8. The tubing of claim 1 wherein the extrudable melt-processible thermoplastic of the thick outer layer consists essentially of zinc-chloride resistant Nylon 6.

9. A layered tubing for use in a motor vehicle, the tubing comprising:
    an outer layer having an inner and an outer face, the outer layer consisting essentially of an extrudable melt-processible thermoplastic;
    an intermediate layer uniformly connected with the inner face of the outer layer, the intermediate layer consisting essentially of an extrudable melt processible thermoplastic capable of sufficiently permanent laminar connection with the inner face of the outer layer; and
    an inner layer uniformly connected with the intermediate layer, the inner layer consisting of an extrudable, melt-processible thermoplastic capable of sufficiently permanent laminar connection with the intermediate layer;
    wherein the thermoplastic material employed in the intermediate layer exhibits at least some resistance to interaction with short-chain hydrocarbon molecules present in material conveyed through the tubing.

10. The tubing of claim 9 wherein the thermoplastic material employed in the intermediate layer includes as a major constituent an extrudable, melt processible thermoplastic selected from the group consisting of polyvinylidine fluoride, polyvinyl fluoride, polyvinyl acetate and urethane, and mixtures thereof.

11. A layered tubing for use in a motor vehicle, the tubing comprising:
    an outer layer having an inner and an outer face, the outer layer consisting essentially of an extrudable melt-processible thermoplastic;
    an intermediate layer uniformly connected with the inner face of the outer layer, the intermediate layer consisting essentially of an extrudable melt processible thermoplastic capable of sufficiently permanent laminar connection with the inner face of the outer layer;
    an inner layer uniformly connected with the intermediate layer, the inner layer consisting of an extrudable, melt-processible thermoplastic capable of sufficiently permanent laminar connection with the intermediate layer; and
    an exterior jacket overlying the outer layer, the exterior jacket composed of a thermoplastic selected from the group consisting of Nylon 11, Nylon 12, zinc chloride resistant Nylon 6, Santoprene, Kraton, Vichem, Sarlink and mixtures thereof.

12. A layered tubing for use in a motor vehicle, the tubing comprising:
    an outer layer having an inner and an outer face, the outer layer consisting essentially of an extrudable 6 carbon block polyamide;

an intermediate layer uniformly connected with the inner face of the outer layer, the intermediate layer consisting essentially of an extrudable thermoplastic capable of sufficiently permanent laminar connection with the polyamide outer layer; and an inner layer uniformly connected with the intermediate layer, the inner layer consisting essentially of an extrudable, melt-processible fluoroplastic capable of sufficiently permanent laminar connection with the intermediate layer, the fluoroplastic selected from the group consisting of polychlorotrifluoroethylene, ethylene tetrafluoroethylene copolymers, and mixtures thereof.

13. The tubing of claim 12 further comprising an exterior jacket overlying the outer layer, the exterior jacket composed of a material consisting essentially of a thermoplastic material selected from the group consisting of Nylon 11, Nylon 12, zinc chloride resistant Nylon 6, Santoprene, Kraton, Vichem, Sarlink, polypropylene and mixtures thereof.

14. The tubing of claim 12 wherein the thermoplastic material of the inner layer is capable of dissipating electrostatic energy.

15. The tubing of claim 12 wherein the thermoplastic material of the inner layer contains quantities of a conductive material sufficient to provide electrostatic dissipation.

16. The tubing of claim 15 wherein the conductive material is selected from the group consisting of elemental carbon, copper, silver, gold, nickel, silicon, and mixtures thereof and is present in an amount less than about 5% by volume of the extrudable thermoplastic material.

17. The tubing of claim 15 wherein the conductive material is blended into the melt-processible thermoplastic material.

18. The tubing of claim 15 wherein the conductive material is elemental carbon and is incorporated during polymerization of monomers that make up the thermoplastic material.

19. The tubing of claim 12 wherein the extrudable thermoplastic of the intermediate layer is a thermoplastic selected from the group consisting of polyvinylidine fluoride, polyvinyl fluoride, polyvinyl acetate and urethane, and mixtures thereof.

20. The layered tubing of claim 1 wherein the inner layer is in underlying co-extruded relationship with the intermediate layer.

21. The layered tubing of claim 20 wherein the intermediate layer is in underlying co-extruded relationship with the outer layer.

22. The layered tubing of claim 21 wherein the intermediate layer is composed of a thermoplastic material which includes as a major constituent, an extrudable thermoplastic selected from the group consisting of polyvinylidine fluoride, polyvinyl fluoride, blends of polyvinyl acetate and urethane, and mixtures thereof.

23. The layered tubing of claim 22 wherein at least one layer is capable of dissipating electrostatic energy in an amount sufficient to minimize accumulation of electrostatic charge in the tubing.

24. The layered tubing of claim 22 wherein the outer layer is composed of an extrudable, melt-processible thermoplastic selected from the group consisting of polyamides, thermoplastic elastomers and mixtures thereof.

25. The layered tubing of claim 12 wherein the inner layer is in underlying co-extruded relationship with the intermediate layer.

26. The layered tubing of claim 12 wherein the intermediate layer is in underlying co-extruded relationship with the outer layer.

27. The layered tubing of claim 12 wherein the inner layer is in direct underlying co-extruded adhesion with said intermediate layer.

28. The layered tubing of claim 12 wherein the intermediate layer is in direct underlying co-extruded adhesion with the outer layer.

29. A layered tubing for use in a motor vehicle, the tubing comprising:

an outer layer having an inner and an outer face, the outer layer consisting essentially of an extrudable melt-processible thermoplastic 6 carbon block polyamide;

an intermediate layer uniformly connected with the outer layer interior thereto, the intermediate layer consisting essentially of a melt-processible thermoplastic capable of sufficiently permanent laminar connection with the outer layer, the melt-processible thermoplastic exhibiting at least some resistance to interaction with short-chain hydrocarbon molecules present in material conveyed through the tubing;

an inner layer uniformly connected with the intermediate layer, the inner layer consisting of a melt-processible thermoplastic, the melt-processible thermoplastic material of the inner layer chemically differing from the melt-processible thermoplastic of the intermediate layer.

30. The tubing of claim 29 wherein the thermoplastic material of the intermediate layer includes as a major constituent an extrudable, melt-processible thermoplastic selected from the group consisting of polyvinyl fluroide, polyvinylidine fluoride, blends of polyvinyl acetate and urethane, and mixtures thereof.

31. The layered tubing of claim 29 wherein the inner layer is in underlying co-extruded relationship with the intermediate layer.

32. The layered tubing of claim 31 wherein the inner layer is in underlying co-extruded relationship with the outer layer.

33. The layered tubing of claim 31 wherein the inner layer is capable of dissipating electrostatic energy in an amount sufficient to minimize accumulation of electrostatic charge in the tubing.

34. The tubing of claim 32 wherein the melt-processible polyamide employed in the outer layer is selected from the group consisting of Nylon 11, Nylon 12, Nylon 6, and mixtures thereof.

35. The tubing of claim 34 wherein the tubing includes up to two additional concentric layers.

36. The layered tubing of claim 1 wherein the melt-processible thermoplastic employed in the inner layer is a fluoroplastic selected from the group consisting of polychlorotrifluoroethylene, ethylene tetrafluoroethylene copolymers and mixtures thereof.

* * * * *

UNITED STATES PATENT AND TRADEMARK OFFICE
CERTIFICATE OF CORRECTION

PATENT NO. : 5,884,671
DATED : March 23, 1999
INVENTOR(S) : David L. Noone and Frank L. Mitchell It is certified that error appears in the above-identified patent and that said Letters Patent is hereby corrected as shown below:

Column 4, line 58, delete "16" and insert --12--.

Column 10, line 36, delete "fluroide" and insert --fluoride--.

Signed and Sealed this

Nineteenth Day of September, 2000

*Attest:*

Q. TODD DICKINSON

*Attesting Officer*   *Director of Patents and Trademarks*